US012647877B2

(12) United States Patent
Nammalvar et al.

(10) Patent No.: US 12,647,877 B2
(45) Date of Patent: Jun. 2, 2026

(54) MANAGING REGULATORY COMPLIANCE OF WIRELESS DEVICES

(71) Applicant: Hewlett Packard Enterprise Development LP, Spring, TX (US)

(72) Inventors: Nirupan Venkatesh Nammalvar, San Jose, CA (US); Shubham Saloni, San Jose, CA (US); Prateek Patni, San Jose, CA (US); Selva Ulaganathan Jeyakumar, San Jose, CA (US); Wade Steven Penner, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 593 days.

(21) Appl. No.: 18/162,008

(22) Filed: Jan. 31, 2023

(65) Prior Publication Data

US 2024/0259919 A1 Aug. 1, 2024

(51) Int. Cl.
H04W 4/00 (2018.01)
H04W 48/16 (2009.01)

(52) U.S. Cl.
CPC .................................. H04W 48/16 (2013.01)

(58) Field of Classification Search
CPC ...................................................... H04W 48/16
USPC .......................................................... 370/328
See application file for complete search history.

(56) References Cited

U.S. PATENT DOCUMENTS

| | | | |
|---|---|---|---|
| 7,301,450 B2 | 11/2007 | Carrino | |
| 7,603,710 B2 | 10/2009 | Harvey et al. | |
| 8,667,602 B2 | 3/2014 | Turk et al. | |

| | | | |
|---|---|---|---|
| 8,694,624 B2 | 4/2014 | Sinha et al. | |
| 8,903,870 B2 | 12/2014 | Turk et al. | |
| 9,313,611 B2 | 4/2016 | Turk et al. | |
| 10,491,603 B1 | 11/2019 | Robinson et al. | |
| 10,691,428 B2 | 6/2020 | Thiru et al. | |
| 10,701,089 B2 | 6/2020 | Paine | |
| 10,848,514 B2 | 11/2020 | Christian | |
| 10,863,432 B2 | 12/2020 | Dunsbergen et al. | |
| 11,042,804 B2 | 6/2021 | Kikinis | |
| 2006/0047809 A1 | 3/2006 | Slattery et al. | |
| 2008/0250500 A1 | 10/2008 | Olson et al. | |
| 2010/0100930 A1 | 4/2010 | King | |

(Continued)

FOREIGN PATENT DOCUMENTS

WO 2020/113139 A1 6/2020

*Primary Examiner* — Temica M Beamer

(74) *Attorney, Agent, or Firm* — Hewlett Packard Enterprise Patent Department

(57) ABSTRACT

An example method for providing enhanced wireless connectivity to client devices is presented. In one example, an access point is configured to monitor management frames it receives and determines if any neighbor AP advertises an unexpected regulatory setting (e.g., country code), and take corrective action if it is determined that the neighbor AP advertises an unexpected regulatory setting. In another example, a network device may be configured to manage a mobile country code (MCC) of the client device by transmitting an executable application. The executable application may ensure that the client device implements the right regulatory configuration. The proposed techniques may prevent the client device from switching to an incorrect regulatory configuration, thereby enhancing the wireless connectivity for the client device.

20 Claims, 7 Drawing Sheets

(56)　　　　　　　References Cited

U.S. PATENT DOCUMENTS

| | | | |
|---|---|---|---|
| 2015/0201370 A1* | 7/2015 | Desai ................... | H04W 48/16 |
| | | | 370/254 |
| 2018/0338244 A1* | 11/2018 | Singhal ................ | H04L 9/3247 |
| 2020/0228621 A1* | 7/2020 | Gamroth ............... | H04W 4/33 |
| 2020/0279015 A1 | 9/2020 | Lu et al. | |
| 2020/0322368 A1 | 10/2020 | Cohen et al. | |
| 2021/0144554 A1 | 5/2021 | Courtiade et al. | |
| 2021/0232994 A1 | 7/2021 | Rhodes et al. | |
| 2022/0239785 A1* | 7/2022 | Daniel Marcelino Barbeira ........ | |
| | | | H04W 12/45 |
| 2022/0256430 A1* | 8/2022 | Patwardhan ...... | H04W 36/0061 |
| 2023/0021634 A1* | 1/2023 | He .......................... | H04L 41/20 |

* cited by examiner

MANAGING REGULATORY COMPLIANCE OF WIRELESS DEVICES

BACKGROUND

Typically, a Wireless Local Area Network (WLAN) includes wireless networking devices, such as access points and/or routers, hosted at several locations in a facility to provide wireless connectivity to client devices. Client devices such as laptops, personal computers, smartphones, etc. may connect to such wireless networking devices in the WLAN to exchange data with other wireless-capable devices. Wireless signals in the WLAN are radio frequency (RF) signals. Therefore, these devices communicating using RF signals need to comply with the regulatory rules of the geographic region (e.g., a country) they operate in. The regulatory rules may specify restrictions on one or more frequency bands, communication channels, or a transmit power the client devices can use.

BRIEF DESCRIPTION OF THE DRAWINGS

One or more examples in the present disclosure are described in detail with reference to the following Figures. The Figures are provided for purposes of illustration only and merely depict examples.

Figure 1:
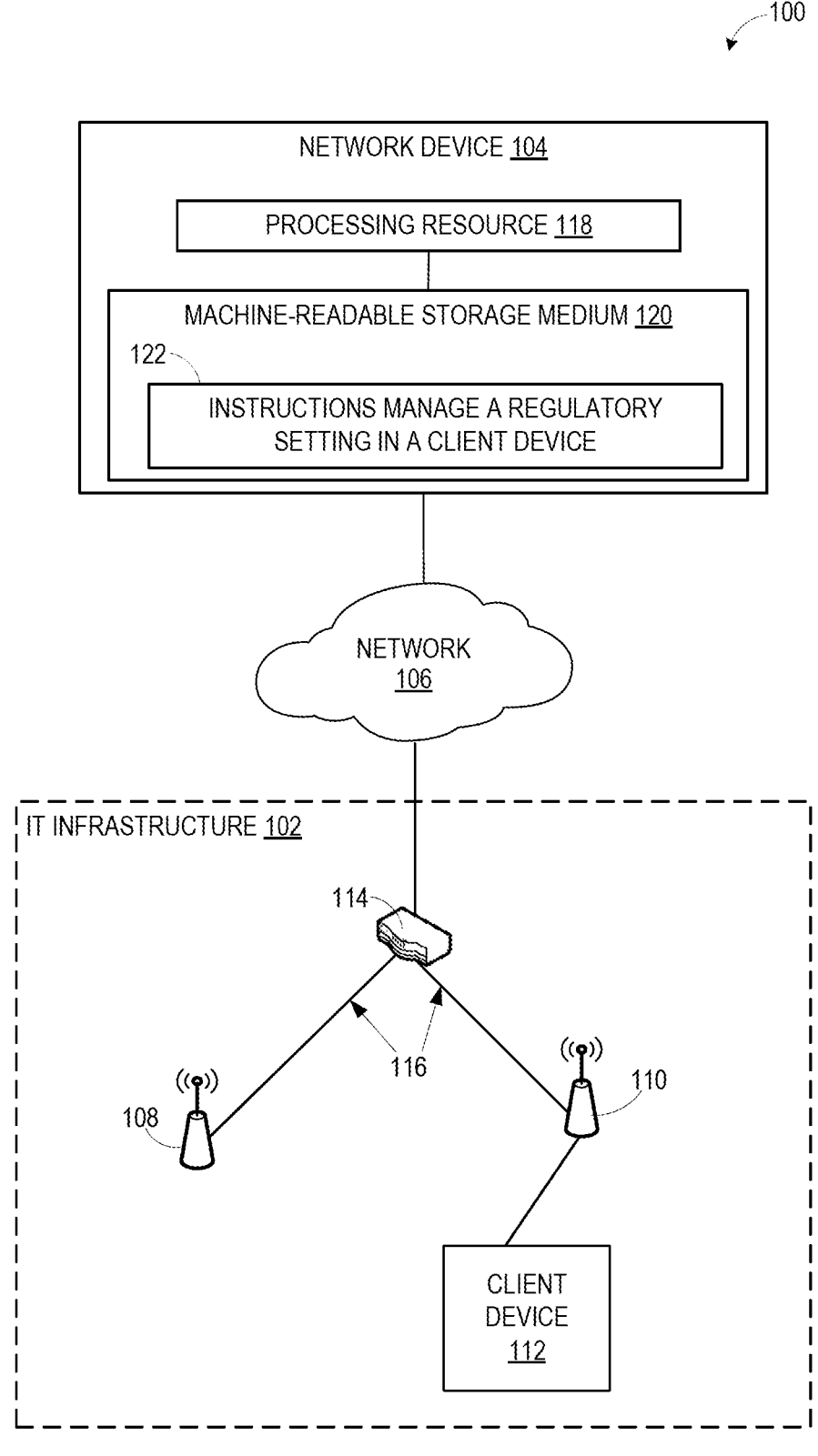
FIG. 1 depicts a block diagram of a networked system in which various of the examples presented herein may be implemented.

The Figures are not exhaustive and do not limit the present disclosure to the precise form disclosed.

DETAILED DESCRIPTION

Wireless networking devices may be deployed in WLANs to provide Wi-Fi connectivity to client devices. In particular, the wireless networking devices may provide wireless connectivity to the client devices using wireless communication techniques specified in several Institute of Electrical and Electronics Engineers (IEEE) 802.11 standard specifications, for example.

Typically, a regulatory setting such as a Mobile Country Code (MCC) may be embedded in the client device. In particular, the MCC may be stored as a part of the device registry settings in the client devices. The MCC may be an identifier that specifies a particular geographic region (e.g., a country) for the client device. Accordingly, the MCC may dictate which country the client device is operating in and what regulatory rules the client device need to comply with. Generally, the MCC may be chosen based on factors such as the country in which the client device was manufactured/purchased, Wi-Fi networks that the client device detects in its vicinity using 802.11d information, a sim card it carries, or cellular network that it sees around in the vicinity, or the like.

With globalization, a client device purchased anywhere may connect to any WLAN network in any geographic region. In such cases, there can be issues if the regulatory setting (e.g., the MCC) of the client device is different from a geographic region supported by the wireless networking devices (e.g., APs). The IEEE 802.11d Specification provides support for an AP to advertise a geographic region in certain management frames (e.g., beacon frames and probe frames).

Generally, most Wi-Fi 6E-capable client devices rely on the Reduced Neighbor Report Information Element (RNR IE) in beacon frames for discovering APs supporting the 6 GHz frequency band. The beacon frames may be transmitted over 2.4 GHz or 5 GHz frequency bands and may be alternatively referred to as 2.4 GHz beacons or 5 GHz beacons. The RNR IE contains the Basic Service Set Identifier (BSSID), a Service Set Identifier (SSID), a channel number, and certain other information necessary for the client device to scan a network operating on the 6 GHz frequency band. Further, as previously noted, the APs that are configured to support the IEEE 802.11d Specification may also advertise a geographic region (e.g., country information) in the RNR IE. The client devices may generally use the geographic region to determine an appropriate set of regulatory compliances.

Different geographic regions may have different rules governing the usage of frequency bands and/or communication channels within the frequency bands. If the client device incorrectly determines the geographic region, the client device may also implement an incorrect regulatory configuration. In such situations, the regulatory configuration may be based on the rules governing the usage of frequency bands and/or communication channels in the incorrectly determined geographic region. Accordingly, the client device may face several issues in wireless communication depending on the regulatory configuration it uses. For instance, an incorrectly detected geographic region may cause the client device to be blocked from communicating with wireless networks at certain frequency bands (e.g., the 6 GHz frequency band) or certain communication channels that are banned in the detected geographic region. In particular, when dealing with the 6 GHz frequency band, which has not yet achieved worldwide regulatory support, this can lead to complete denial of service for the 6 GHz frequency band if the detected geographic region is not supporting the 6 GHz frequency band. Additionally, for other bands (e.g., the 2.4 GHz and/or 5 GHz frequency bands), this can lead to the client devices being unable to connect to APs operating on certain communication channels operating at the barred communication channels. This may force the client devices to connect to other radios and frequency bands with suboptimal performance.

In recent experiments, it has been observed that many client devices stop scanning SSIDs operating on the 6 GHz frequency band if the client devices detect any beacon advertising a country that has not yet enabled the 6 GHz frequency band. Moreover, a client device may be running older versions of an operating system that has not enabled the 6 GHz frequency band for a country that the client device has detected.

Typically, when a client device detects a different country in any beacon that it receives, the client device causes its MCC to change. This could happen even if there is a single AP in the vicinity of the client device that transmits beacons containing a country code different from the client device's current MCC setting. For instance, it was observed in an experiment that a presence of an AP advertising country code-FR (e.g., country code related to France) caused a client device whose MCC is set to a country code-US (e.g., country code related to the United States) to stop scanning the SSIDs operating on the 6 GHz frequency band. Although the rest of the beacons advertised the country code of the US, a single non-US country code caused this issue.

An attacker may install an AP with a country code that does not support the 6 GHz frequency band. This can block the client devices from connecting to SSIDs operating on the 6 GHz frequency band. Accordingly, the client devices may have to operate with reduced wireless connectivity features and an overall deteriorated network usage experience. Further, in some instances, a client device may be taken to a country that does not support the 6 GHz frequency band and is then taken to a country that supports the 6 GHz frequency band and its MCC is not updated due to some reason, or it still is running an older OS. In both these cases, the client device's dynamic MCC changes may prevent it from scanning SSIDs operating on the 6 GHz frequency band. Similar issues may also be faced in the 5 GHz frequency band. For example, a country such as China does not support Unlicensed National Information Infrastructure (UNII)-2C channels 100 to 140. If a client device with a US country code detects beacons advertising a country code of China, the client device will not be able to scan SSIDs that operate on communication channels 100 to 140.

In accordance with examples consistent with the present disclosure, a technique for managing regulatory compliance of wireless devices is presented to enhance a network usage experience. In some examples presented herein, a Wireless Intrusion Detection System (WIDS) running on an AP may be configured with a feature to scan management frames (e.g., beacon frames and probe frames) from neighbor APs to monitor IEEE 802.11d regulatory configurations. In particular, one or more of the APs (hereinafter referred to as host APs) in a WLAN may be configured to monitor the management frames from respective neighbor APs. A host AP may maintain a region setting specifying a predefined region associated with the host AP. For example, the region setting may include a code or an identifier of the predefined region (e.g., a country or a state) in which the host AP is deployed to operate.

Further, the host AP may identify a geographic region included in the management frame. In particular, the host AP may extract the geographic region from an information element specifying details for the IEEE 802.11d Specification. Once the geographic region is identified from the management frame, the host AP may perform a check to determine if the geographic region included in the management frame is different from a predefined region. If the geographic region included in the management frame is found to be different from the predefined region, the host AP may perform a corrective action for the neighbor AP. In some examples, the corrective action may include performing restrictive actions such as causing the neighbor AP to advertise the predefined region in the management frame, preventing the neighbor AP from advertising the geographic region in the management frame, and/or powering down the neighbor AP. By way of example, if the predefined region is the US and the neighbor AP advertising a geographic region such as "South Africa" is identified based on the management frames, the host AP may implement the corrective action for such neighbor AP. Accordingly, a client device may be prevented from dynamically updating its MCC and switching to a regulatory configuration associated with the geographic region included in the management frame.

In some examples, the corrective action may include generating an alert comprising the geographic region identified from the management frame and a possible consequence of the neighbor AP advertising the geographic region. The host AP may then electronically communicate the alert to a network administrator for the network administrator to take any action or aid in implementing the corrective action. For example, based on the alert the network administrator may take proactive steps to investigate the issue and correct it.

Further, with certain other examples consistent with the present disclosure, another technique for managing regulatory compliance of wireless devices is presented to enhance the network usage experience. In particular, as per this technique, client devices may be facilitated to have a correct MCC setting to ensure that the client devices use the right regulatory configuration. A network device may send a notification to a client device when the client device joins a wireless network. The notification may include an actionable option for a user to enhance the network usage experience. Accordingly, a user's action/response to the option may result in issuing a request for the enhanced network usage experience by the network device.

Upon receiving the request, a network device may transmit an executable application to the client device. The executable application may be configured to update the MCC of the client device based on a geographic region of the wireless network if the MCC of the client device is different from the geographic region of the wireless network. As will be appreciated, the update of the MCC of the client device based on the geographic region of the wireless network prevents the client device from switching to any regulatory configuration different from a regulatory configuration of the geographic region of the wireless network. In particular, the update of the MCC based on the geographic region of the wireless network causes the client device to implement a regulatory configuration associated with the geographic region of the wireless network. After the MCC is updated, the client device may communicate with wireless networking devices (e.g., APs, routers, etc.) in the wireless network as per the regulatory configuration associated with the geographic region of the wireless network.

As will be appreciated, the proposed techniques may allow the client devices to use the right regulatory configuration, thereby aiding the client devices to benefit from enhanced wireless communication features (e.g., the 6 GHz frequency band and/or use of certain channels). In particular, having 6E capable clients getting on the 6 GHz frequency band allow the client device to take advantage of 6E high-performance multi-gigabit speed with robust security and increased capacity with wider bandwidth, low latency, and less interference. Furthermore, with enterprise APs operating on the 6 GHz frequency band, the benefits of the 6 GHz frequency band may be utilized to a greater extent when all the 6 GHz supported client devices are connected to the 6 GHz frequency band. Also, moving the 6E capable client devices to the 6 GHz frequency band rather than clogging the 2.4 GHz and/or 5 GHz frequency bands makes it possible to allocate the 2.4 GHz and/or 5 GHz frequency bands to non-6E capable client devices. Better utilization of the 6 GHz frequency band, as effected by the proposed example techniques, may help improve the adaptation of the wireless networking devices implementing newer Wi-Fi technologies with advanced features and performance.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed systems and methods in detail, it is useful to describe an example network installation with which these systems and methods might be implemented in various applications. FIG. 1 illustrates a system 100 in which various of the examples presented herein may be implemented. The system 100 may be implemented for any setup for example, in a home setup or an organization, such as a business, educational institution, governmental entity, healthcare facility, or other organization. The system 100 may include an IT infrastructure 102, or both the IT infrastructure 102 and a network device 104. In FIG. 1, although the network device 104 is shown external to the IT infrastructure 102, in some examples, the network device 104 may be a part of the IT infrastructure 102.

The IT infrastructure 102 may be of a small-scale network of devices or a large-scale network of devices. The small-scale network of devices may be a home network hosting a fewer number of network devices, for example. The large-scale network of devices may be an organization, university, public utility space (e.g., mall, airport, railway station, bus station, stadium, etc.), or office network hosting a large number of network devices, for example. The IT infrastructure 102 may span across more than one site, for example, a room, a floor of a building, a building, or any other space that can host network devices. The IT infrastructure 102 may be a private network, such as a network that may include security and access controls to restrict access to authorized users of the private network.

The IT infrastructure 102 may include several devices that communicate with each other and/or with any external device or system outside the IT infrastructure 102. For illustration purposes, the IT infrastructure 102 of FIG. 1 is shown to include two APs 108 and 110 (hereinafter collectively referred to as APs 108-110) and a client device 112. Further, in some examples, the IT infrastructure 102 may optionally include a controller 114 that is in communication with an external network 106. It is to be noted that the examples presented herein are not limited by the specifics (e.g., types and counts) of the devices depicted in FIG. 1. In some examples, the APs 108-110, the client device 112, and the controller 114 may be configured to communicate other devices using wireless communication techniques specified in one or more IEEE 802.11 standard specifications.

The examples of client device 112 may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, virtual terminals, video game consoles, virtual assistants, Internet-of-Things (IoT) devices, and the like. Further, the client device 112 may be configured with a regulatory setting that may dictate the regulatory configuration implemented by the client device 112. The regulatory setting may be an MCC which may be stored as a part of the device registry settings in the client device 112. The MCC may dictate which country the client device 112 is operating in and what regulatory rules the client device need to comply with. Also, in some examples, the client device 112 may be able to dynamically update the MCC based on the discovery of regulatory settings from signals (e.g., certain management frames from APs) it receives.

The APs 108-110 may act as a point of access to a local network established in IT infrastructure 102 and/or the external network 106 for the client device 112. Each of APs 108-110 may be a combination of hardware, software, and/or firmware that is configured to provide wireless network connectivity to client device 112. The APs 108-110 may communicate with the client devices (e.g., the client device 112) in accordance with one or more IEEE 802.11 standard specifications. In particular, the APs 108-110 may be configured to transmit management frames, such as beacons and/or probe frames to client devices to advertise their communication features and capabilities. For example, the management frames may include information such as a BSSID, an SSID, a channel number, and certain other information necessary to aid the client device 112 to connect to any wireless network. Moreover, APs that are configured to support the IEEE 802.11d Specification may also advertise a geographic region (e.g., country code) in certain management frames they transmit. The client devices may generally use the geographic region to determine an appropriate set of regulatory compliances for it to operate. In particular, the client device may enable or disable certain communication features based on the country code determined from the received management frames.

Each of the APs 106-108 may communicate with the controller 114 over respective connections 116, which may include wired and/or wireless interfaces. The controller 114 may provide communication with the network 106 for the IT infrastructure 102, though it may not be the only point of communication with the network 106 for the IT infrastructure 102. In some examples, the controller 114 may communicate with the network 106 through a router (not shown). In other implementations, the controller 114 may provide router functionality to the devices in the IT infrastructure 102. In some examples, the controller 114 may be a wireless local area network (WLAN) controller. The controller 114 may be operable to configure and manage network devices, such as at the IT infrastructure 102, and may also manage network devices at other remote sites, if any, within the IT infrastructure 102. The controller 114 may be operable to configure and/or manage switches, routers, access points, and/or client devices connected to a network. The controller 114 may itself be, or provide the functionality of, an AP.

The network 106 may be a public or private network, such as the Internet, or another communication network to allow connectivity between the IT infrastructure 102 and the network device 104. The network 106 may include third-party telecommunication lines, such as phone lines, broadcast coaxial cables, fiber optic cables, satellite communications, cellular communications, and the like. In some examples, the network 106 may include any number of intermediate network devices, such as switches, routers, gateways, servers, and/or controllers, which are not directly part of the IT infrastructure 102 but that facilitate communication between the various parts of the IT infrastructure 102, and between the IT infrastructure 102 and any other network-connected entities.

The network device 104 may be hosted on a network outside the IT infrastructure 102. In some examples, the network device 104 may be deployed on a cloud platform hosted on a public, private, or hybrid cloud outside the IT infrastructure 102. In some examples, the network device 104 may be implemented as one or more computing systems, for example, computers, controllers, servers, or storage systems. In certain examples, the network device 104 may be an electronic device having a hardware processing resource 118, such as one or more central processing units (CPUs), semiconductor-based microprocessors, and/or other hardware devices suitable for retrieval and execution of instructions stored in a machine-readable storage medium 120. In certain other examples, the network device 104 may be implemented as a software resource, such as a software application, a virtual machine (VM), a container, a containerized application, or a pod. In some examples, the network device 104 may be implemented as a service running on a "cloud computing" environment or as a "software as a service" (SaaS). The network device 104 may be offered as a stand-alone product or a packaged solution that can be utilized on a one-time full product/solution purchase or pay-per-use basis.

In certain other examples, not shown in FIG. 1, the network device 104 may be deployed within the IT infrastructure 102. In such an implementation, the network device 104 may be connected to controller 114 or any of the APs 108-110. In some other examples, the network device 104 may be implemented as an AP. In an alternative implementation, the controller 114 may be configured to operate as the network device 104.

In accordance with some examples, wireless networking devices such as APs may be configured to implement a technique for managing regulatory compliance for client devices in the IT infrastructure 102. In particular, a Wireless Intrusion Detection System (WIDS) running on an AP (e.g., the AP 108, also referred to as the host AP 108) may be configured with a feature to scan management frames from neighbor APs (e.g., the AP 110, also referred to as the neighbor AP 110). With this, the host AP 108 may be configured to monitor IEEE 802.11d regulatory settings advertised by the neighbor AP 110 via the management frames. Further, the host AP 108 may maintain a region setting specifying a predefined region associated with the host AP 108. For example, the region setting may include a code or an identifier of the predefined region (e.g., a country or a state) in which the host AP 108 is deployed to operate. By way of example, if the IT infrastructure 102 is physically located in a region of the United States, the host AP 108 (which is located within the IT infrastructure 102) may store a country code-'US' as a regulatory setting. Accordingly, the host AP 108 may comply with the regulatory configurations applicable to the United States. The term "regulatory configuration" may refer to a specification concerning the use of RF signals. For example, the regulatory configuration for a given geographic region may specify what frequency bands and/or communication channels are allowed for use in the given geographic region.

The term "frequency band" may refer to a range of RF frequencies to transmit data in the wireless spectrum. Example frequency bands that may be supported by APs or other wireless networking devices as per the latest IEEE 802.11 specifications may include a 2.4 GHz frequency band, a 5 GHz frequency band, and a 6 GHz frequency band. In the future, additionally or alternatively, the APs may support any other frequency band(s) that may be introduced in future versions of the wireless communication standards. Further, each wireless frequency band may be divided into several channels. Accordingly, a communication channel may be a sub-range of radio wave frequencies within a given wireless frequency band.

The host AP 108 may be configured to monitor the management frames that it receives from all neighbor APs, such as the neighbor AP 110 for identifying the country code advertised therein. Also, the host AP may perform a check to determine if the country code advertised in the management frame is different from the predefined region configured for the host AP 108. Management frames are the data transmission units that are transmitted by the access points to advertise their wireless communication capabilities which may be used by the client devices to find and/or connect to the right Wi-Fi network (e.g., SSID) and manage the client connection after a successful association. Example management frames are beacon frames, probe frames, authentication frames, de-authentication frames, association frames, and disassociation frames.

If the host AP 108 determines that the country code advertised in the management frames is different from the predefined region, the host AP 108 may perform a corrective action for the neighbor AP 110. By way of example, the host AP 108 may cause the neighbor AP 110 to advertise the predefined region (i.e., the same region configured with the host AP 108) in the management frames transmitted by the neighbor AP. As a result, the client devices may not receive any management frame that advertises a country code other than the country code of the predefined region. By way of example, if the predefined region is the US, and the neighbor AP 110 is identified as advertising a geographic region such as "South Africa", the host AP 108 may implement the corrective action for such neighbor AP 110. Accordingly, the client device 112 may be prevented from dynamically updating its MCC and switching to a regulatory configuration for a region different from the US.

Further, in some examples, upon determining that the country code advertised in the management frames is different from the predefined region, the host AP 108 may generate an alert. The alert may specify the geographic region identified from the management frames and a possible consequence of the neighbor AP 110 advertising the geographic region. The host AP 108 may then electronically communicate the alert to a network administrator for the network administrator to take any action to prevent any adverse impact caused by such advertising of unwanted/unexpected country codes. For example, based on the alert the network administrator may take proactive steps to investigate the issue and correct it.

Figure 3:
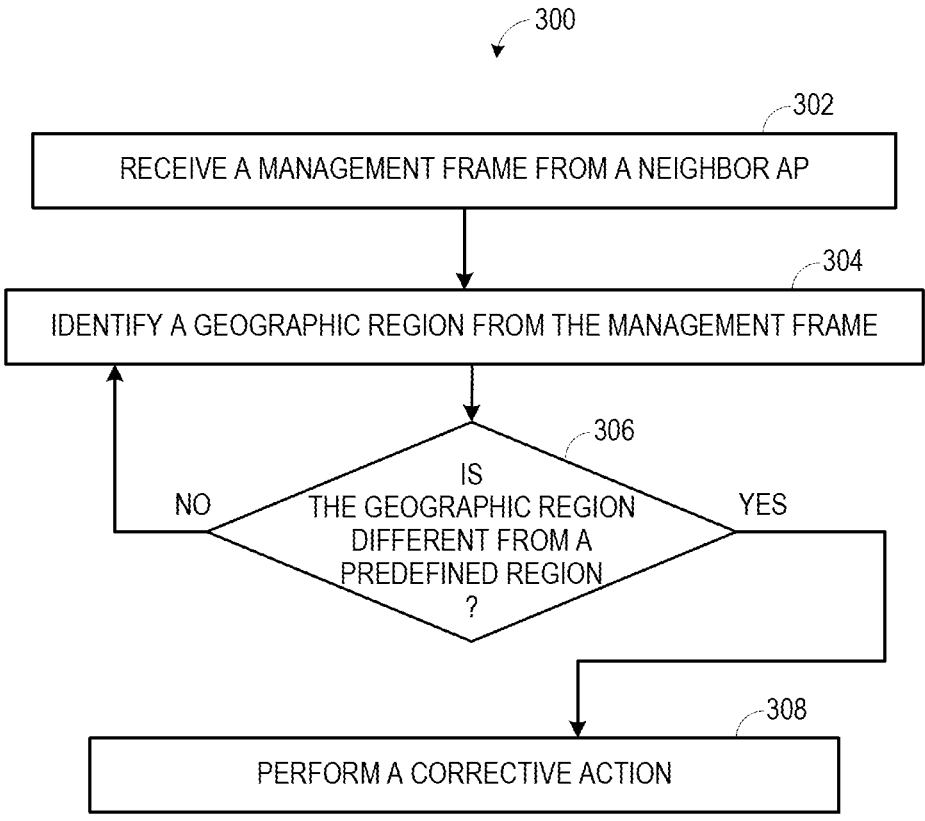
FIG. 3 depicts a flowchart of an example method for managing APs advertising an unexpected geographic region.

Additional details of managing an AP advertising an unexpected country code are described in conjunction with the methods described in FIG. 3.

Alternatively or additionally, in some examples, the network device 104 may aid the client device 112 in maintaining a correct MCC setting to ensure that the client device 112 uses the right regulatory configuration. In particular, the network device 104 may prompt notification to the client device 112 when it joins a wireless network (e.g., SSID) established via any of the APs 108-110. The notification may provide an actionable option for the user of the client device 112 to opt for an enhanced network usage experience. The user's affirmative response to the option may result in issuing a request to the network device 104 for the enhanced network usage experience. The network device 104 may transmit an executable application to the client device upon receiving the request. The executable application may configure the MCC of the client device based on a geographic region of the wireless network. Additional details of managing the MCC of the client device 112 via the executable application are described in conjunction with the methods described in FIGS. 4 and 5A-5B.

Figure 2:
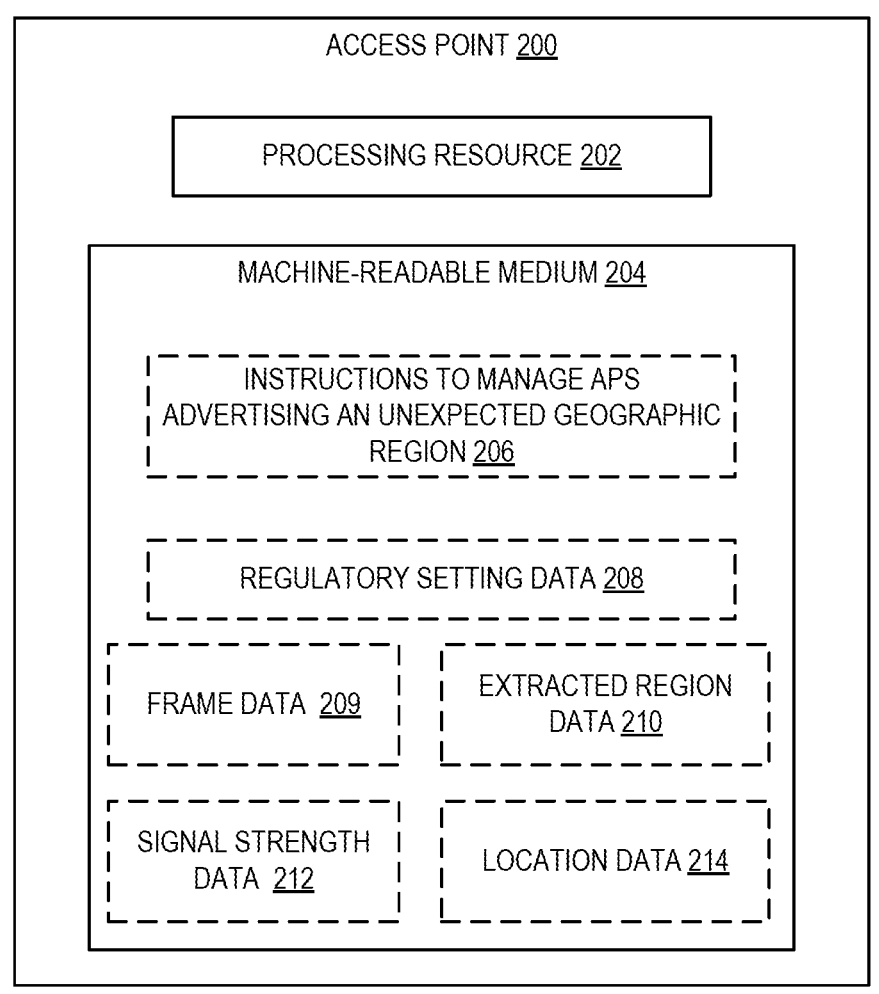
FIG. 2 depicts a block diagram of an example access point including a processing resource and a machine-readable storage medium.

Referring now to FIG. 2, a block diagram of an example AP 200 is presented. The AP 200 of FIG. 2 may be an example representative of the host AP 108 of FIG. 1. The AP 200 may be configured to manage other APs (e.g., the neighbor AP 110 shown in FIG. 1) advertising unexpected regulatory settings (e.g., country code) to reduce performance impacts on the client devices. In some examples, the AP 200 may include a processing resource 202 and/or a machine-readable storage medium 204 for the AP 200 to execute several operations as will be described in the greater details below.

The machine-readable storage medium 204 may be non-transitory and is alternatively referred to as a non-transitory machine-readable storage medium that does not encompass transitory propagating signals. The machine-readable storage medium 204 may be any electronic, magnetic, optical, or another type of storage device that may store data and/or executable instructions. Examples of the machine-readable storage medium 204 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, and the like. The machine-readable storage medium 204 may be encoded with instructions 206 (depicted using a dashed box in FIG. 2) for managing APs advertising unexpected regulatory settings. Although not shown, in some examples, the machine-readable storage medium 204 may be encoded with certain additional executable instructions to perform any other operations performed by the AP 200, without limiting the scope of the present disclosure.

In addition to the instructions 206, in some examples, the machine-readable storage medium 204 may also include certain additional data stores, for example, a region setting data 208, a frame data 209, an extracted region data 210, a signal strength data 212, and a location data 214. In particular, the region setting data 208 may be a datastore representative of a predefined geographical region of the AP 200. The region setting data 208 may store IEEE 802.11d configuration data, such as a country code of the predefined geographical region of the AP 200. The frame data 209 may be a temporary store of the management frames that the AP 200 receives from its neighbor APs. Further, the extracted region data 210 may be a datastore containing geographical region codes (e.g., the country codes) extracted from the management frames received by the AP 200. Furthermore, the signal strength data 212 may be a datastore containing signal strength values (e.g., values represented as received signal strength indicators expressed in decibels) corresponding to one or more neighbor APs. In some examples, the processing resource 202 may be configured to determine the signal strengths for one or more neighbor APs based on the signals that it receives from these neighbor APs or by performing ranging measurements with these neighbor APs. Moreover, the location data 214 may be a datastore containing location-specific data, for example, the longitude and latitude of the neighbor APs and/or relative distances between the AP 200 and each of the neighbor APs. The processing resource 202 may determine the location-specific data based on signals received from the neighbor APs and/or the respective signal strengths.

The processing resource 202 may be a physical device, for example, a central processing unit (CPU), a microprocessor, a graphics processing unit (GPU), a field-programmable gate array (FPGA), application-specific integrated circuit (ASIC), other hardware devices capable of retrieving and executing instructions stored in the machine-readable storage medium 204, or combinations thereof. The processing resource 202 may fetch, decode, and execute the instructions 206 stored in the machine-readable storage medium 204 to manage APs advertising unexpected regulatory settings. As an alternative or in addition to executing the instructions 206, the processing resource 202 may include at least one integrated circuit (IC), control logic, electronic circuits, or combinations thereof that include a number of electronic components for performing the functionalities intended to be performed by the AP 200.

In accordance with examples consistent with the present disclosure, the AP 200 may implement, by way of the processing resource 202 executing the instructions 206, a method of managing APs advertising unexpected regulatory settings. In particular, in some examples, the processing resource 202 may execute one or more of the instructions 206 to perform the method steps described in conjunction with FIG. 3.

Referring now to FIG. 3, a flowchart of an example method 300 for managing APs advertising unexpected regulatory settings is depicted. In some examples, the steps shown in FIG. 3 may be performed by any suitable device, such as an AP (e.g., the AP 108, 200). In some examples, the suitable device may include a processing resource suitable for retrieval and execution of instructions (e.g., the instructions 206 depicted in FIG. 2) stored in a machine-readable storage medium. The processing resource and the machine-readable storage medium may be example representatives of the processing resource 202 and the machine-readable storage medium 204 of the AP 200. As an alternative or in addition to retrieving and executing instructions, the processing resource may include one or more electronic circuits (e.g., FPGA, ASIC, or other electronic circuits) that include electronic components for performing the functionality of one or more instructions, such as an FPGA.

At step 302, a host AP may receive a management frame from a neighbor AP. Generally, the APs broadcasts management frames such as beacons or transmits probe and/or probe response to client devices. By way of example, the APs periodically broadcast the beacons to advertise their wireless communication capabilities. Typically, the beacons may include information such as a timestamp, a beacon interval, and capability information such as SSID, supporting rates, Frequency-hopping (FH) Parameter Set, Direct-Sequence (DS) Parameter Set, Contention-Free (CF) Parameter Set, traffic indication map, and the like.

In some examples, the beacons may also include information about the regulatory settings of the transmitting AP. Especially, if support for IEEE 802.11d is enabled in the neighbor AP, the beacons transmitted by the neighbor AP may include an information element containing its regulatory setting. The regulatory setting may include a country code related to the geographic region configured for the AP transmitting the beacon. Accordingly, in some examples, the host AP may receive the management frame (e.g., beacon) from the neighbor AP. Once received, the host AP may store the received management frame in frame data (e.g., the frame data 209 depicted in FIG. 2). Also, as previously described, the host AP also maintains a region setting (e.g., in the region setting data 208 depicted in FIG. 2) specifying a predefined region associated with the host AP.

Further, at step 304, the host AP may identify the geographic region included in the management frame. In particular, the processing resource of the host AP may extract the management frame from the frame data and parse its content. Then, the processing resource may locate a specific information element that contains the regulatory setting of the AP transmitting the beacon, and extract the country code of the AP.

Furthermore, at step 306, the host AP may perform a check to determine whether the geographic region included in the management frame is different from the predefined region. In particular, the host AP may compare the country code extracted from the management frame with a country code associated with the predefined region configured for the host AP. If the country code extracted from the management frame matches with a country code associated with the predefined region, the host AP may determine that the neighbor AP (i.e., the one that transmitted the beacon) is configured with the right regulatory setting and continue to monitor the management frames. However, at step 306, if the host AP determines that the geographic region included in the management frame is different from the predefined region, the host AP may determine that the neighbor AP is advertising unexpected regulatory settings that may impact the performance of the client devices in the network. Accordingly, in response to determining that the geographic region included in the management frame is different from the predefined region, the host AP, at step 308, may perform a corrective action for the neighbor AP. In particular, the corrective action may be aimed to ensure that such neighbor AP advertising the unexpected country codes is stopped from doing so. In particular, the corrective action prevents the client device from switching to a regulatory configuration associated with the geographic region included in the management frame.

At step 302, a host AP may receive a management frame (e.g., a beacon or a probe) from a neighbor AP. As previously noted, the management frame may include an information element containing the regulatory setting of the neighbor AP. In some examples, the host AP may store the management frame in frame data (e.g., the frame data 209 depicted in FIG. 2). Further, the processing resource of the host AP may extract the regulatory setting from the management frame. In particular, the processing resource of the host AP may obtain the management frame from the frame data and parse the management frame to locate the information element containing the regulatory setting (e.g., the country code) in the management frame (step 304). In particular, such information element may include information specific to IEEE 802.11d configuration of the neighbor AP. The regulatory setting may be extracted from this information element.

Furthermore, at step 306, the host AP may perform a check to determine whether the country code (extracted as described above) included in the management frame is different from the country code configured with the host AP. If the country code extracted from the management frame matches the country code configured with the host AP, the host AP may determine that the neighbor AP (i.e., the one that transmitted the beacon) is configured with the right regulatory setting. For example, if the country code advertised by the neighbor AP in its beacons is "US" and the country code configured with the host AP is also "US," the host AP may determine that the neighbor AP is advertising the right regulatory setting.

However, at step 306, if the host AP determines that the country code included in the management frame is different from the country code configured with the host AP, the host AP may determine that the neighbor AP is advertising unexpected regulatory settings that may impact the performance of the client devices in the network. For example, if the country code advertised by the neighbor AP in its beacons is "FR" and the country code configured with the host AP is also "US," the host AP may determine that the neighbor AP is advertising an unexpected regulatory setting. In particular, if any corrective measure is not implemented, a beacon with such an unexpected regulatory setting may cause the client devices to modify the respective MCCs resulting in the client devices switching to more restrictive regulatory configurations. In response to determining that the country code extracted from the management frame is different from the country code configured with the host AP, the host AP may perform one or more corrective actions (step 308). Some of the corrective actions may be aimed to stop the neighbor AP from advertising the unexpected country codes.

Some corrective actions may include one or more restrictive actions. For example, the host AP may prevent the neighbor AP from advertising the regulatory settings (e.g., geographic region) in the management frame. In particular, the host AP may send an instruction to the neighbor AP to stop advertising the geographic region in the beacons (or any other management frames it may transmit). In response, the neighbor AP may disable the IEEE 802.11d support causing the neighbor AP not to advertise the regulatory settings in the management frames. In another example, the host AP may notify a WLAN controller (e.g., the controller) about the particular neighbor AP advertising the unexpected country code and instruct the WLAN controller to disable the IEEE 802.11d support in the neighbor AP. In yet another example, the host AP may notify an administrator of the host AP and/or an administrator of the neighbor AP about the neighbor AP advertising the unexpected regulatory setting. The respective administrator may then reconfigure the neighbor AP (e.g., disable the IEEE 802.11d support).

In another example, the host AP may perform a restrictive action such as causing the neighbor AP to advertise the predefined region in the management frame. In one example, the host AP may send an instruction to the neighbor AP with a correct regulatory setting (e.g., country code) to be advertised by the neighbor AP. In another example, the host AP may notify a WLAN controller (e.g., the controller) about the particular neighbor AP advertising the unexpected country code. The WLAN controller may in turn send the instruction to the neighbor AP with a correct regulatory setting (e.g., country code) to be advertised by the neighbor AP. In yet another example, the host AP may notify an administrator of the host AP and/or an administrator of the neighbor AP about the neighbor AP advertising the unexpected regulatory setting. The respective administrator may then reconfigure the neighbor AP with the correct regulatory setting for the neighbor AP to advertise the predefined region in the management frame.

In yet another example, the host AP may perform a restrictive action such as powering down the neighbor AP. Accordingly, the neighbor AP may not be operational and will not be able to transmit any frames. In a similar fashion as described above, to power down the neighbor AP, the host AP may communicate instructions and/or notifications to the WLAN controller, the administrators, or directly to the neighbor AP. Responsive to receiving the instructions, the WLAN controller, the administrators, or the neighbor AP may take actions to power down the neighbor AP.

Further, in some examples, the host AP may be configured to generate an alert for the administrator of the host AP. The alert may include information such as one or more of an identity (e.g., a MAC address) of the neighbor AP, the geographic region (e.g., the country code) extracted from the management frame, or a possible consequence of the neighbor AP advertising the geographic region. The possible consequence may be one or more of performance degradation of the client devices in the network, increased disassociation of the client devices, the client devices being unable to use the 6 GHz frequency band, congestion of the lower frequency bands (e.g., the 2.4 and 5 GHz frequency bands), or a possibility of a network attack. In some examples, the alert may also include a recommendation on the corrective action, for example, one or more of the restrictive actions described earlier.

Further, the host AP may electronically communicate the alert to a network administrator. The alert may be sent using one or more messaging techniques, including but not limited to, displaying an alert message on a display, via a text message such as a short message service (SMS), a Multimedia Messaging Service (MMS), and/or an email, via an audio alarm, video, or an audio-visual alarm, a phone call, etc. Upon receiving the alert, the administrator may take corrective action to address the issue of the neighbor AP advertising the unexpected regulatory setting.

Additionally, in some examples, the host AP may determine a signal strength of the neighbor AP in response to determining (at step 406) that the country code included in the management frame is different from the country code configured with the host AP. The host AP may determine the signal strength based on the frames that it receives from the neighbor AP. The signal strength may be represented as a received signal strength indicator (RSSI) and is a measurement of the power present in a received radio signal from the neighbor AP at a receiving device (e.g., the host AP). Further, the host AP may determine the location of the neighbor AP based on the signal strength. Generally, the signal strength may be higher for a neighbor AP that is closer to the host AP, and vice-versa. Accordingly, the location may be a relative position of the neighbor AP with reference to the location of the host AP. In some examples, the host AP may perform several ranging measurements (e.g., Fine Time Measurement (FTM)) to determine the relative position of the neighbor AP with reference to the location of the host AP. Once the location of the neighbor AP is determined, the host AP may store the location details in a location data (e.g., the location data 214 shown in FIG. 2). Further, in some examples, the host AP may include the location of the neighbor AP in the generated alert. The location information in the alert may help the administrator locate the neighbor AP to physically reach the neighbor and perform any corrective action.

Returning to FIG. 1, a block diagram of an example network device 104 is presented. The network device 104 may be an example representative of the network device 104 of FIG. 1 and is operable to manage an MCC of client devices. Such management of the MCC may reduce performance impacts on the client devices caused by APs advertising unexpected regulatory settings. In some examples, the network device 104 may include a processing resource 118 and/or a machine-readable storage medium 120 for the network device 104 to execute several operations as will be described in the greater details below. The processing resource 118 and the machine-readable storage medium 120 may be example representatives of the processing resource 202 and the machine-readable storage medium 204 of FIG. 2, certain details of which are not repeated herein for brevity.

In some examples, the machine-readable storage medium 120 may be encoded with instructions 122 (depicted using a dashed box in FIG. 2) for managing an MCC of client devices. Although not shown, in some examples, the machine-readable storage medium 120 may be encoded with certain additional executable instructions to perform any other operations performed by the network device 104, without limiting the scope of the present disclosure. The processing resource 118 may fetch, decode, and execute the instructions 122 stored in the machine-readable storage medium 120 to manage the MCC of client devices. Further, in implementations where the network device 104 is deployed on a cloud platform as a virtual resource or a software application, the processing resource 118 and the machine-readable storage medium 120 may be representative of the processing resource and the machine-readable storage medium of a host computing system hosting the network device 104 as a service, application, or a virtual resource (e.g., a virtual machine or a container).

In accordance with examples consistent with the present disclosure, the network device 104 implements, by way of the processing resource 118 executing the instructions 122, a method of managing the MCC of client devices. In some examples, the processing resource 118 may execute one or more of the instructions 122 to perform the method steps described in conjunction with FIGS. 4 and 5A-5B.

Figure 4:
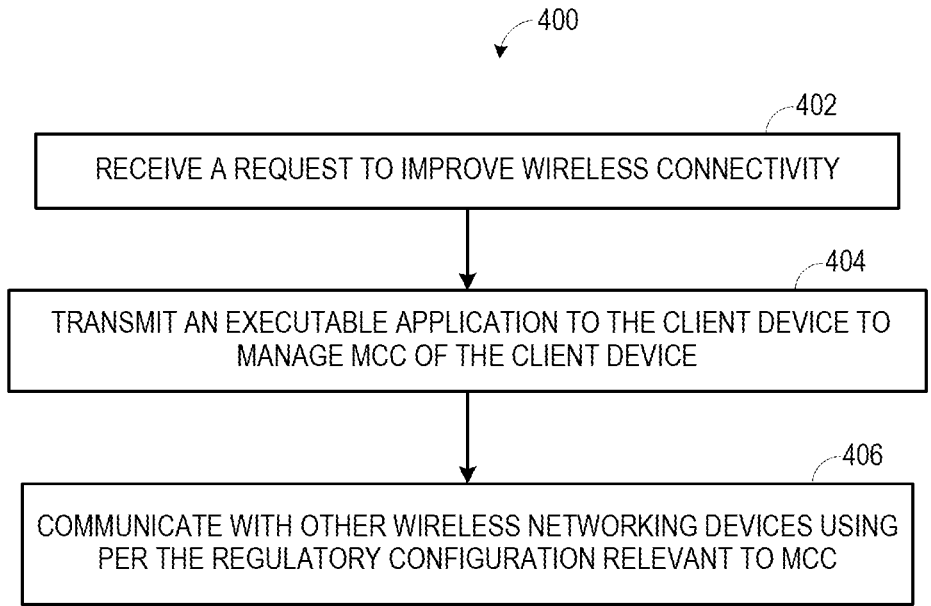
FIG. 4 depicts a flowchart of an example method for managing a regulatory setting in a client device.

Referring now to FIG. 4, a flowchart of an example method 400 for managing MCCs of client devices is depicted. In some examples, the steps shown in FIG. 4 may be performed by any suitable device, such as a network device (e.g., the network device 104). In some examples, the suitable device may include a hardware processing resource, such as one or more central processing units (CPUs), semiconductor-based microprocessors, and/or other hardware devices suitable for retrieval and execution of instructions (e.g., the instructions 122 depicted in FIG. 1) stored in a machine-readable storage medium. The processing resource may fetch, decode, and execute instructions, to manage MCCs of client devices. As an alternative or in addition to retrieving and executing instructions, the processing resource may include one or more electronic circuits that include electronic components for performing the functionality of one or more instructions, such as an FPGA, ASIC, or other electronic circuits. The processing resource and the machine-readable storage medium may be example representatives of the processing resource 118 and the machine-readable storage medium 120 of the network device 104.

At step 402, the network device may receive a request to improve wireless connectivity. For example, upon arriving in a wireless network (e.g., Wi-Fi coverage area) the client device may connect to a guest Wi-Fi network which may have limited communication capabilities (e.g., low data speeds, reduced channel bandwidth, etc.). Since a majority of the Wi-Fi capable client devices are compatible to use the 2.4 GHz frequency band, the guest Wi-Fi network may be configured on the 2.4 GHz frequency band. For example, a user that wishes to use the Internet during transit at an airport may use a guest Wi-Fi network at the airport. Upon joining the guest Wi-Fi network and if the user is interested in improving the connectivity experience, the user may send a request to the network device. In one example, the client device of the user may be prompted with an option to send such a request. In another example, the user may be instructed to open a web URL by way of displaying the URL on the client device or instructing the user to scan a QR code that may eventually allow the user to access a web page. The web page may include an actionable icon (e.g., a virtual button or a URL) that the user can click to initiate the request.

Further, at step 404, the network device may transmit an executable application to the client device. The executable application may include program instructions and data useful to update certain registry settings on the client device.

These updated registry settings may allow the client device to implement the right regulatory configuration thereby enabling respective connectivity features. In particular, the executable application is configured to ensure that the MCC of the client device is synchronized with a geographic region of the guest Wi-Fi network to which the client device is connected. In particular, if the executable application determines that the MCC of the client device is a country code different from the country code of the geographic region of the guest Wi-Fi network, the executable application may update the MCC of the client device to match the geographic region of the guest Wi-Fi network. For example, if the MCC of the client device is a country code of France and the guest wireless network is in the US, the executable application may update the MCC to match with the county code of the US.

Once this MCC check is completed by the executable application, the client device, at step 406, may begin to communicate with other wireless networking devices (e.g., the APs) as per the regulatory configuration relevant to the updated MCC.

Figure 5A:
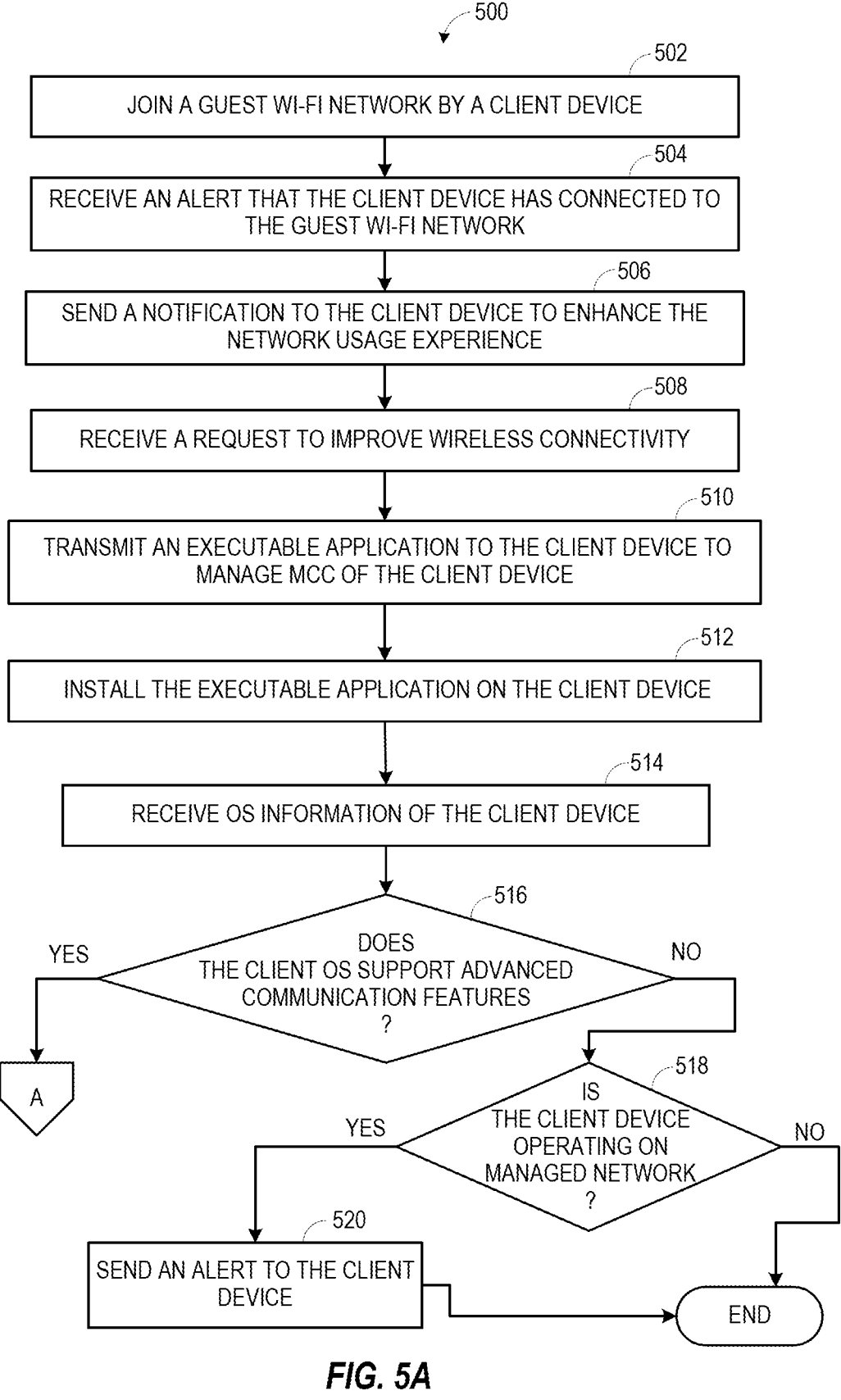
FIGS. 5A and 5B depict a flowchart of another example method for managing a regulatory setting in a client device.
Figure 5B:
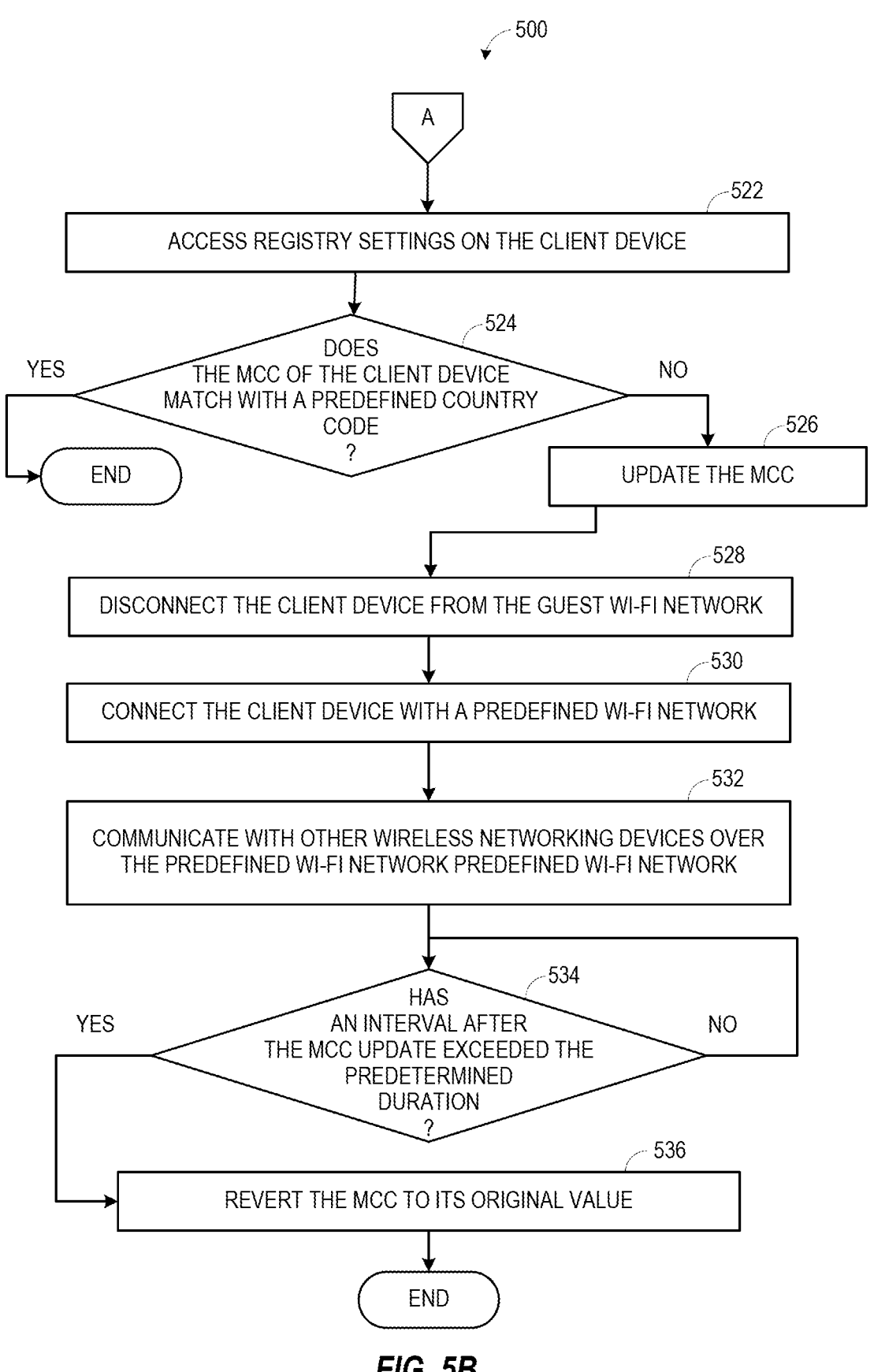

Turning now to FIGS. 5A and 5B depict a flowchart of an example method 500 for managing MCCs of client devices is depicted. The method 500 of FIGS. 5A and 5B may be an example representative of the method 400 of FIG. 4. The method 500 include certain steps similar to those described in conjunction with the method 400, certain description of which is not repeated herein for the sake of brevity. In some examples, at least some of the steps shown in FIGS. 5A and 5B may be performed by any suitable device, such as a network device (e.g., the network device 104) by way of executing instructions (e.g., the instructions 122 depicted in FIG. 1) via a processing resource. In particular, the method 500 includes several steps in order, however, the order of steps shown in FIGS. 5A and 5B should not be construed as the only order for the steps. The steps may be performed at any time, in any order. Additionally, the steps may be repeated or omitted as needed.

At step 502, a client device may join a Wi-Fi network. The Wi-Fi network may be a guest Wi-Fi network that is configured such that the majority of the client device can join the same with login credentials (e.g., username and password) or any other authentication means. In some examples, the guest Wi-Fi network may be a free or open network that does not require user authentication. In one example, the guest Wi-Fi network may be configured on the 2.4 GHz frequency band so that the majority of Wi-Fi capable client devices can easily connect to it and enjoy wireless data connectivity.

Further, at step 504, the network device may receive an alert that the client device has connected to the guest Wi-Fi network. In particular, the AP providing the guest Wi-Fi network may send the alert to the network device after the client device has successfully associated with the AP.

Upon receiving the alert from the AP, at step 506, the network device may send a notification to the client device to enhance the network usage experience in response to determining that the client device has joined the wireless network. The network device may send this notification directly to the client device via the Internet or through the AP connecting the client device over the guest Wi-Fi network. The notification may be in the form of a text message (e.g., email, SMS, MMS) or a prompt via applications such as an internet browser, for example. The notification may include an actionable option that enables the client device to initiate a request to the network device to enhance the network usage experience. For example, the actionable option may be a URL, a virtual button, a check box, or any other feature for the user of the client device to respond to the notification.

In some examples, the notification may also include certain additional information to aid the user in responding to the notification. For instance, the notification may provide details on certain limitations (e.g., reduced data rates, certain features being disabled on the guest Wi-Fi network, etc.) of the guest Wi-Fi network, benefits (e.g., increased data rates, advanced connectivity features, etc.) and possible configuration changes (e.g., registry setting changes) that may apply on opting for the enhanced network user experience. Also, in some examples, the notification may indicate that the user's affirmative action on the notification may cause the client device to download and install an executable application which may update relevant registry settings. The user may respond to the notification by clicking on the actionable option which in turn triggers the request to the network device for enhancing the network usage experience. Accordingly, at step 508, the network device may receive the request from the client device to enhance the network usage experience in response to the notification. In some examples, the user may select not to respond to the notification or cancel, mute, or close the notification resulting in no request to the network device.

Once the request is received, the network device, at step 510 may transmit an executable application to the client device. At step 512, the executable application may be downloaded and installed on the client device. Once installed, in some examples, at step 514, the network device may receive information about an operating system (OS) running on the client device. The executable application may extract such OS-related information (e.g., name and version of the OS) from OS-related configuration data of the client device and cause the client device to send information, such as a name and version of the OS, to the network device. Further, at step 516, the network device may perform a check to determine if the OS of the client device supports one or more advanced communication features for wireless communication. To facilitate such a check on the OS, the network device may maintain a mapping between several OS identifiers (e.g., versions) and respective wireless communication features or IEEE 802.11 Specifications each supports. Accordingly, at step 516, the network device may perform a look-up into such mapping to identify the wireless communication features or IEEE 802.11 Specification that the version of the OS installed on the client device supports.

At step 516, if it is determined that the OS does not support one or more advanced communication features for wireless communication, at step 518, the network device may perform another check to determine if the client device is operating on a managed network (e.g., the guest Wi-Fi network). The "managed network" is a wireless network in which devices such as the networking devices and the client devices may be administered and managed by an administrator of the guest network. For example, in an enterprise setup, wireless networks are generally the managed networks and the devices connected in such networks are managed by an IT administrator as per the enterprise's IT policy. On the other hand, wireless networks in public places may be unmanaged. In some examples, the network device may store a database of managed networks that are registered with the network device. By way of example, such managed network database may include identities (e.g., SSIDs, BSSIDs, etc.) of the managed networks. Accordingly, the network device may check if the network that the client device is currently operating on is a managed network based on the data contained in the database of managed networks.

At step 518, if it is determined that the network is an unmanaged network, the method 500 may terminate. However, at step 518, if it is determined that the network is a managed network, the network device, at step 520, may send an alert to the client device and the method 500 may terminate after sending the alert. The alert is useful to indicate that the OS running on the client device is outdated and may not support certain newer and/or advanced wireless communication features. If the user wants to use better Wi-Fi capabilities, an update of the OS may be required. To that end, in some examples, the alert may also include a suggestion about updating the OS to a newer version. In some examples, the alert may also include a link to the update of the OS.

Referring again to step 516, if it is determined that the OS supports one or more advanced communication features for wireless communication, at step 522 (see FIG. 5B), the executable application may cause a processing resource (e.g., a processor/CPU) of the client device to access registry settings on the client device to verify the MCC of the client device. At step 524, the executable application may cause the processing resource of the client device to verify the MCC of the client device by performing a check to determine if the MCC matches a predefined country code. The predefined country code used at step 524 may be representative of the geographic region of the Wi-Fi network (e.g., the guest network) to which the client device is connected. At step 524, if the processing resource determines that the MCC matches the predefined country code, the processing resource may terminate end the process of MCC verification.

At step 524, if it is determined that the MCC does not match the predefined country code, at step 526, the executable application may cause the processing resource to update the MCC. In particular, the MCC may be updated to match the predefined country code. For example, if the MCC of the client device is a country code of France and the guest wireless network is in the US, the executable application may update the MCC to match with the county code of the US. Once the MCC is updated, the client device may be configured with the regulatory configuration relevant to the predefined country code. For example, the processing resource may set a regulatory profile specific to the predefined country code. For instance, as the MCC has been updated to the country code "US," the processing resource may pick the regulatory profile related to the United States which allows the use of the 6 GHz frequency band and related enhanced connectivity features.

Once this regulatory configuration is set by the executable application, the client device, at step 528, the executable application may cause the client device to disconnect from the guest Wi-Fi network. In particular, the client device may disassociate from the AP facilitating the guest Wi-Fi network. Further, at step 530, the executable application may cause the client device to connect with a predefined Wi-Fi network (e.g., SSID) by initiating a connection process. The predefined Wi-Fi network may be configured to operate on higher frequency bands, for example, the 5 GHz or the 6 GHz frequency band to use advanced wireless connectivity features such as one or more of traffic prioritization, orthogonal frequency-division multiple access (OFDMA), and beamforming, Target Wait Time (TWT), Multiple-User, Multiple-In, Multiple-Out (MU-MIMO), Wi-Fi protected access, advanced modulation scheme (e.g., 4K Quadrature Amplitude Modulation (QAM)), flexible channel utilization, multi-AP operations, low-latency, high-efficiency, or the like. In some examples, the executable application may maintain a database of several special Wi-Fi networks and identifies the predefined Wi-Fi network from the database. After connecting to the predefined Wi-Fi network, at step 532, the client device may begin to communicate with other wireless networking devices (e.g., the APs) over the predefined Wi-Fi network.

In certain examples, the executable application may be configured to keep the updated MCC in effect for a predetermined duration. The predefined duration may be customizable by an administrator. For such time-bound MCC updates, at step 534, the executable application may cause the processing resource to monitor duration after the MCC has been updated and check whether an interval after the MCC update has exceeded the predetermined duration. At step 534, if it is determined that the interval after the MCC update has not exceeded the predetermined duration, client device may continue to monitor time. However, at step 534, if it is determined that the interval after the MCC update has exceeded the predetermined duration, the executable application, at step 536, may cause the processing resource of the client device to revert the MCC to its original value.

Figure 6:
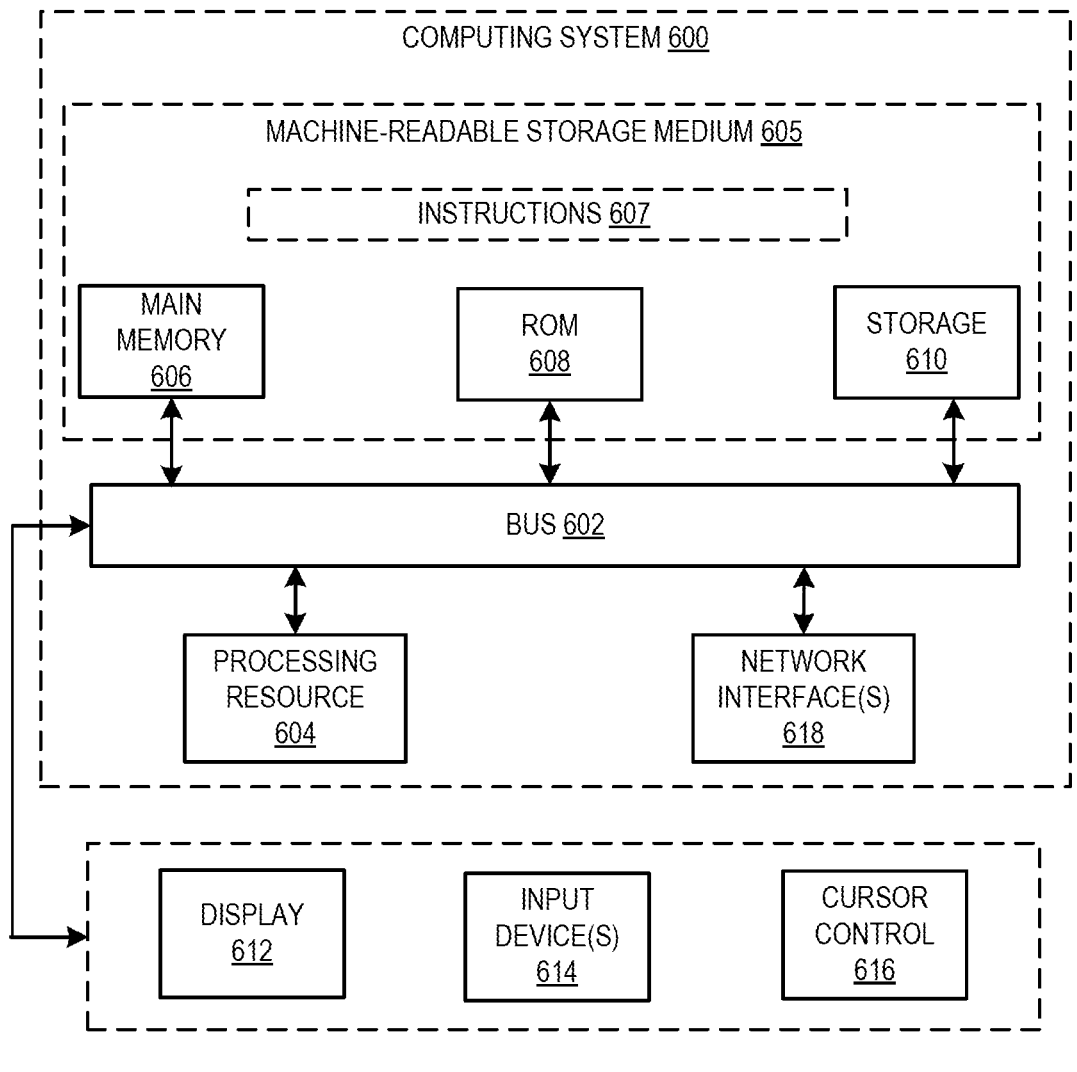
FIG. 6 depicts a block diagram of an example computing system.

FIG. 6 depicts a block diagram of an example computing system 600 in which various of the examples described herein may be implemented. In some examples, the computing system 600 may be configured to operate as an access point, such as the host access point 108 of FIG. 1 and can perform various operations described in one or more of the earlier drawings. In some other examples, the computing system 600 may be configured to operate as a network device, such as the network device 104 of FIG. 1, and can perform various operations described in one or more of the earlier drawings. Examples of the devices and/or systems that may be implemented as the computing system 600 may include, desktop computers, laptop computers, servers, web servers, authentication servers, AAA servers, DNS servers, DHCP servers, IP servers, VPN servers, network policy servers, mainframes, tablet computers, e-readers, netbook computers, televisions and similar monitors (e.g., smart TVs), content receivers, set-top boxes, PDAs, mobile phones, smartphones, smart terminals, dumb terminals, virtual terminals, video game consoles, virtual assistants, IoT devices, and the like.

The computing system 600 may include a bus 602 or other communication mechanisms for communicating information, a hardware processor, also referred to as processing resource 604, and a machine-readable storage medium 605 coupled to the bus 602 for processing information. In some examples, the processing resource 604 may include one or more CPUs, semiconductor-based microprocessors, and/or other hardware devices suitable for retrieval and execution of instructions stored in a machine-readable storage medium 605. The processing resource 604 may fetch, decode, and execute instructions to configure the wireless networking device. As an alternative or in addition to retrieving and executing instructions, the processing resource 604 may include one or more electronic circuits that include electronic components for performing the functionality of one or more instructions, such as an FPGA, an ASIC, or other electronic circuits.

In some examples, the machine-readable storage medium 605 may include a main memory 606, such as a RAM, cache and/or other dynamic storage devices, coupled to the bus 602 for storing information and instructions to be executed by the processing resource 604. The main memory 606 may also be used for storing temporary variables or other intermediate information during the execution of instructions to be executed by the processing resource 604. Such instructions, when stored in storage media accessible to the processing resource 604, render the computing system 600 into a special-purpose machine that is customized to perform the operations specified in the instructions. The machine-readable storage medium 605 may further include a read-only memory (ROM) 608 or other static storage device coupled to the bus 602 for storing static information and instructions for the processing resource 604. Further, in the machine-readable storage medium 605, a storage device 610, such as a magnetic disk, optical disk, or USB thumb drive (Flash drive), etc., may be provided and coupled to the bus 602 for storing information and instructions.

In some examples, the computing system 600 may be coupled, via the bus 602, to a display 612, such as a liquid crystal display (LCD) (or touch-sensitive screen), for displaying information to a computer user. In some examples, an input device 614, including alphanumeric and other keys (physical or software generated and displayed on a touch-sensitive screen), may be coupled to the bus 602 for communicating information and command selections to the processing resource 604. Also, in some examples, another type of user input device such as a cursor control 616 may be connected to the bus 602. The cursor control 616 may be a mouse, a trackball, or cursor direction keys. The cursor control 616 may communicate direction information and command selections to the processing resource 604 for controlling cursor movement on the display 612. In some other examples, the same direction information and command selections as cursor control may be implemented via receiving touches on a touch screen without a cursor.

In some examples, the computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 600 also includes a network interface 618 coupled to bus 602. The network interface 618 provides a two-way data communication coupling to one or more network links that are connected to one or more local networks. For example, the network interface 618 may be an integrated services digital network (ISDN) card, cable modem, satellite modem, or a modem to provide a data communication connection to a corresponding type of telephone line. As another example, the network interface 618 may be a local area network (LAN) card or a wireless communication unit (e.g., Wi-Fi chip/module).

In some examples, the machine-readable storage medium 605 (e.g., one or more of the main memory 606, the ROM 608, or the storage device 610) stores instructions 607 which when executed by the processing resource 604 may cause the processing resource 604 to execute one or more of the methods/operations described hereinabove. The instructions 607 may be stored on any of the main memory 606, the ROM 608, or the storage device 610. In some examples, the instructions 607 may be distributed across one or more of the main memory 606, the ROM 608, or the storage device 610. In some examples, when the computing system 600 is configured to operate as a network device 104, the instructions 607 may include instructions that when executed by the processing resource 604 may cause the processing resource 604 to perform one or more of the methods described in FIG. 3, 4, or 5A-5B.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, third, etc., may be used herein to describe various elements, these elements should not be limited by these terms, as these terms are only used to distinguish one element from another unless stated otherwise or the context indicates otherwise.

What is claimed is:

1. A method comprising:
   maintaining, by a host access point (AP), a region setting specifying a defined region corresponding to a regulatory configuration of the host AP;
   receiving, by the host AP, a management frame from a neighbor AP;
   identifying, by the host AP, a geographic region included in the management frame;
   determining, by the host AP, that the geographic region included in the management frame is different from the defined region; and
   performing, by the host AP, a corrective action for the neighbor AP in response to the determination that the geographic region included in the management frame is different from the defined region.

2. The method of claim 1, wherein the management frame comprises one or more of a beacon frame, a probe frame, or both.

3. The method of claim 1, wherein identifying the geographic region comprises obtaining region information stored in an information element specifying details for the IEEE 802.11d Specification.

4. The method of claim 1, wherein performing the corrective action comprises performing a restrictive action.

5. The method of claim 4, wherein performing the restrictive action comprises causing the neighbor AP to advertise the defined region in the management frame.

6. The method of claim 4, wherein performing the restrictive action comprises preventing the neighbor AP from advertising the geographic region in the management frame.

7. The method of claim 4, wherein performing the restrictive action comprises powering down the neighbor AP.

8. The method of claim 1, wherein performing the corrective action comprises:
   generating an alert comprising the geographic region identified from the management frame and a possible consequence of the neighbor AP advertising the geographic region; and
   electronically communicating the alert to a network administrator.

9. The method of claim 8, further comprising:

determining, by the host AP, a signal strength of the neighbor AP in response to determining that the geographic region included in the management frame is different from the defined region; and determining, by the host AP, a location of the neighbor AP based on the signal strength, wherein the alert further comprises the location of the neighbor AP.

10. The method of claim 1, wherein the corrective action prevents a client device, receiving the management frame from the neighbor AP, from switching to a regulatory configuration associated with the geographic region included in the management frame.

11. A host access point (AP), comprising:

a machine-readable storage medium storing executable instructions and a region setting specifying a defined region associated with the host AP; and a processing resource coupled to the machine-readable storage medium, wherein the processing resource is configured to execute one or more of the instructions to:

maintain the region setting specifying the defined region corresponding to a regulatory configuration;

receive a management frame from a neighbor AP;

identify a geographic region included in the management frame; and determine that the geographic region included in the management frame is different from the defined region; and perform a corrective action for the neighbor AP in response to the determination that the geographic region included in the management frame is different from the defined region.

12. The host AP of claim 11, wherein to identify the geographic region, the processing resource is configured to execute one or more of the instructions to obtain region information stored in an information element specifying details for the IEEE 802.11d Specification.

13. The host AP of claim 11, wherein the corrective action comprises one or more of causing the neighbor AP to advertise the defined region in the management frame, prevent the neighbor AP from advertising the geographic region in the management frame, or powering-down the neighbor AP.

14. The host AP of claim 11, wherein to perform the corrective action, the processing resource is configured to execute one or more of the instructions to:

generate an alert comprising the geographic region identified from the management frame and a possible consequence of the neighbor AP advertising the geographic region; and electronically communicate the alert to a network administrator.

15. A method, comprising:

based on receiving an alert, by a network device, that a client device has joined a first wireless network, transmitting, by the network device, an executable application to the client device, wherein the executable application is configured to update a mobile country code (MCC) of the client device based on a geographic region of the first wireless network comprising the network device if the MCC of the client device is different from the geographic region of the wireless network, wherein an update of the MCC of the client device based on the geographic region of the first wireless network causes the client device to implement a regulatory configuration associated with the geographic region of the first wireless network;

upon implementing the regulatory configuration associated with the geographic region of the first wireless network, disconnecting the client device from the first wireless network and connecting the client device to a second wireless network; and communicating, by the client device, with a wireless networking device in the second wireless network as per the regulatory configuration associated with the geographic region of the first wireless network.

16. The method of claim 15, wherein the client device joins the first wireless network over a 2.4 GHz frequency band.

17. The method of claim 15, further comprising:

in response to receiving the alert that the client device as joined the first wireless network, communicating, by the network device, a notification to the client device to enhance a network usage experience in response to determining that the client device has joined the first wireless network, wherein the notification includes an actionable option that enables the client device to initiate the request to enhance the network usage experience; and receiving, by the network device, the request from the client device to enhance the network usage experience in response to the notification.

18. The method of claim 15, wherein the executable application is configured to revert the MCC of the client device to its original value after a predetermined duration from updating the MCC of the client device.

19. The method of claim 15, further comprising:

receiving, by the network device, information of an operating system (OS) running on the client device via the executable application;

determining, by the network device, that the OS supports one or more advanced communication features for wireless communication; and generating, by the network device, an alert indicating that the OS running on the client device is outdated, wherein the alert further comprises a suggestion about updating the OS to a newer version.

20. The method of claim 15, wherein the update of the MCC of the client device based on the geographic region of the first wireless network increases usage of a 6 GHz frequency band operated by the second wireless network resulting in the client device operating with high speeds, robust security, wider bandwidth, low latency, less interference, or combinations thereof.

* * * * *